US011087362B2

(12) United States Patent
Bonawitz et al.

(10) Patent No.: US 11,087,362 B2
(45) Date of Patent: Aug. 10, 2021

(54) SYSTEMS AND METHODS FOR PRIVATE LOCAL SPONSORED CONTENT

(71) Applicant: Google LLC, Mountain View, CA (US)

(72) Inventors: Keith Bonawitz, Watchung, NY (US); Daniel Ramage, Seattle, WA (US); David Petrou, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 112 days.

(21) Appl. No.: 16/694,691

(22) Filed: Nov. 25, 2019

(65) Prior Publication Data

US 2020/0098011 A1 Mar. 26, 2020

Related U.S. Application Data

(63) Continuation of application No. 15/270,165, filed on Sep. 20, 2016, now Pat. No. 10,504,154.

(51) Int. Cl.
*G06Q 30/02* (2012.01)
*H04L 9/00* (2006.01)
*H04L 29/06* (2006.01)
*G06N 5/02* (2006.01)

(52) U.S. Cl.
CPC ......... *G06Q 30/0269* (2013.01); *G06N 5/025* (2013.01); *G06Q 30/0251* (2013.01); *G06Q 30/0261* (2013.01); *H04L 9/008* (2013.01); *H04L 63/0428* (2013.01)

(58) Field of Classification Search
CPC ........... G06Q 30/0269; G06Q 30/0261; G06Q 30/0251; H04L 9/008; H04L 63/0428; G06N 5/025
See application file for complete search history.

(56) References Cited

U.S. PATENT DOCUMENTS

| 7,472,093 | B2 | 12/2008 | Juels |
| 10,181,049 | B1 * | 1/2019 | El Defrawy ........ G06F 21/6227 |
| 2006/0212350 | A1 | 9/2006 | Ellis et al. |

(Continued)

OTHER PUBLICATIONS

Non-Final Office Action on U.S. Appl. No. 15/270,165 dated Jan. 10, 2019 (8 pages).

(Continued)

*Primary Examiner* — Theodore C Parsons
(74) *Attorney, Agent, or Firm* — Foley & Lardner LLP

(57) ABSTRACT

Systems and methods are shown for providing private local sponsored content selection and improving intelligence models through distribution among mobile devices. This allows greater data gathering capabilities through the use of the sensors of the mobile devices as well as data stored on data storage components of the mobile devices to create predicted models while offering better opportunities to preserve privacy. Locally stored profiles comprising machine intelligence models may also be used to determine the relevance of the data gathered and in improving an aggregated model for identifying the relevance of data and the selection of sponsored content items. Distributed optimization is used in conjunction with privacy techniques to create the improved machine intelligence models. Publishers may also benefit from the improved privacy by protecting the statistics of type or volume of sponsored content items shown with publisher content.

20 Claims, 4 Drawing Sheets

(56) References Cited

U.S. PATENT DOCUMENTS

| | | |
|---|---|---|
| 2010/0124907 A1 | 5/2010 | Hull et al. |
| 2011/0022461 A1 | 1/2011 | Simeonov |
| 2012/0316956 A1 | 12/2012 | Nath et al. |
| 2015/0170197 A1 | 6/2015 | Smith et al. |

OTHER PUBLICATIONS

Notice of Allowance on U.S. Appl. No. 15/270,165 dated Aug. 13, 2019 (7 pages).
T. Chen, et al., "Content Recommendation System Based on Private Dynamic User Profile," 2007 International Conference on Machine Learning and Cybernetics, Hong Kong, 2007 (7 pages).

\* cited by examiner

SYSTEMS AND METHODS FOR PRIVATE LOCAL SPONSORED CONTENT

CROSS REFERENCES TO RELATED APPLICATIONS

This application is a continuation of and claims priority to U.S. patent application Ser. No. 15/270,165, filed Sep. 20, 2016, which is incorporated by reference herein in its entirety.

BACKGROUND

In a networked environment, such as the Internet or other networks, first-party content providers can provide information for public presentation on resources, for example web pages, documents, applications, and/or other resources. The first-party content can include text, video, and/or audio information provided by the first-party content providers via, for example, a resource server for presentation on a user device, such as a mobile device, over the Internet. Additional third-party content, such as sponsored content items, can also be provided by third-party content providers for presentation on the user device together with the first-party content provided by the first-party content providers. Thus, a person viewing a resource can access the first-party content that is the subject of the resource, as well as the third-party content that may or may not be related to the subject matter of the resource. The selection of the third-party content may be based on information associated with the person viewing the first-party content or data available on the user device. Statistics regarding interaction or display of the third-party content are often gathered and sent to the third-party content providers.

SUMMARY

One implementation relates to a system running on one or more processors of a device with a display, network interface, and a computer storage device electrically connected to the one or more processors of the device. The computer storage device stores instructions, that when executed by the one or more processors, cause the one or more processors to perform operations. The operations comprise receiving, via the network interface, a machine intelligence model comprising rules and a first and second parameter and storing, by the computer storage device, the received model. The operations further comprise receiving, via the network interface, an updated value for the first parameter of the machine intelligence model and updating the stored machine intelligence model based on the updated value for the first parameter. The operations further comprise receiving, via the network interface, one or more parameters for a differentially private mechanism, retrieving first local data from the computer storage device, adjusting a value of the second parameter of the stored machine intelligence model based on the first local data, transmitting data associated with the adjusted value of the second parameter by applying the one or more parameters for the differentially private mechanism to the adjusted value of the second parameter via the network interface, applying the stored machine intelligence model to second local data retrieved from the computer storage device to determine the second local data is relevant in selecting sponsored content items, transmitting a request via the network interface, based on the relevance of the second local data, for a homomorphically encrypted sponsored content item, the request comprising a vector of encrypted entries, receiving, via the network interface, the homomorphically encrypted sponsored content item, decrypting the received homomorphically encrypted sponsored content item, and presenting the decrypted received homomorphically encrypted sponsored content item on the display. A sensor may be operably connected to the device with the computer storage device storing further instructions to cause the one or more processors to perform further operations including receiving sensor data from the sensor, with the received sensor data being part of the second local data. Further instructions may comprise receiving data associated with a plurality of sponsored content items and the request for the homomorphically encrypted sponsored content item including a vector of encrypted entries corresponding to the data associated with the plurality of sponsored content items, the entries constrained such that the logical XOR of the vector of encrypted entries has a '1' in the entry corresponding to the homomorphically encrypted sponsored content item Further data transmitted can include data comprising demographic data from a user profile and data indicating an impression or conversion of the decrypted sponsored content item presented on the display, one or both of which transmitted by applying the one or more parameters for the differentially private mechanism to the data before transmission. In some implementations, the device is retrieving data comprising the user profile data from computer storage of the device before transmitting the retrieved demographic data. Determining whether the second local data is relevant in selecting sponsored content items can include the use of comparison of features extracted from the second local data to features from a plurality of possible sponsored content items.

Another implementation relates to a system running on one or more processors of a device with a display, network interface, and a computer storage device electrically connected to the one or more processors of the device, with the computer storage device storing instructions, when executed by the one or more processors, cause the one or more processors to perform operations. The operations comprise receiving, receiving, via the network interface, a machine intelligence model comprising rules and a first and second parameter and storing, by the computer storage device, the received model. The operations further comprise receiving, via the network interface, an updated value for the first parameter of the received machine intelligence model, updating the stored machine intelligence model based on the updated value for the first parameter, retrieving first local data from the computer storage device, adjusting a value of the second parameter of the stored machine intelligence model based on the first local data, encrypting the adjusted value of the second parameter of the stored machine intelligence model with a public key, transmitting, via the network interface, data comprising the encrypted, adjusted value of the second parameter, receiving, via the network interface, data associated with the transmitted encrypted, adjusted value of the second parameter, decrypting, using a private key corresponding to the public key, the data associated with the transmitted encrypted, adjusted value of the second parameter, transmitting, via the network interface, the decrypted data, applying the stored machine intelligence model to second local data retrieved from the computer storage device to determine the second local data is relevant in selecting sponsored content items, transmitting a request via the network interface, based on the relevance of the second local data, for a homomorphically encrypted sponsored content item, the request comprising a vector of encrypted entries, receiving, via the network interface, the homomorphically encrypted sponsored content item, decrypting the received homomorphically encrypted sponsored content item, and presenting the decrypted sponsored content item on the display. In some implementations, the device is retrieving the user profile data from computer storage of the device before transmitting the retrieved demographic data. Further data encrypted and transmitted can include data comprising demographic data from a user profile and data indicating an impression or conversion of the decrypted sponsored content item presented on the display. In some implementations a second public key is used to encrypt the retrieved data and data indicating an impression or conversion of the decrypted sponsored content item. In some implementations, the device is retrieving the user profile data from a data storage device of the device before transmitting the encrypted, retrieved demographic data.

Another implementation relates to a method comprising the steps of receiving, by a computing device, a machine intelligence model comprising rules and a first and second parameter, storing, on the computing device, the received model, receiving, by the computing device, an updated value for the first parameter of the machine intelligence model, updating the stored machine intelligence model based on the updated value for the first parameter, receiving, by the computing device, one or more parameters for a differentially private mechanism, retrieving first local data from the computer storage device, adjusting a value of the second parameter of the stored machine intelligence model based on the first local data, transmitting data associated with the adjusted value of the second parameter by applying the one or more parameters for the differentially private mechanism to the adjusted value of the second parameter via the network interface, applying the stored machine intelligence model to second local data retrieved from the computer storage device to determine the second local data is relevant in selecting sponsored content items, transmitting a request via the network interface, based on the relevance of the second local data, for a homomorphically encrypted sponsored content item, the request comprising a vector of encrypted entries, receiving, via the network interface, the homomorphically encrypted sponsored content item, decrypting the received homomorphically encrypted sponsored content item, and presenting the decrypted received homomorphically encrypted sponsored content item on the display.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Figure 1:
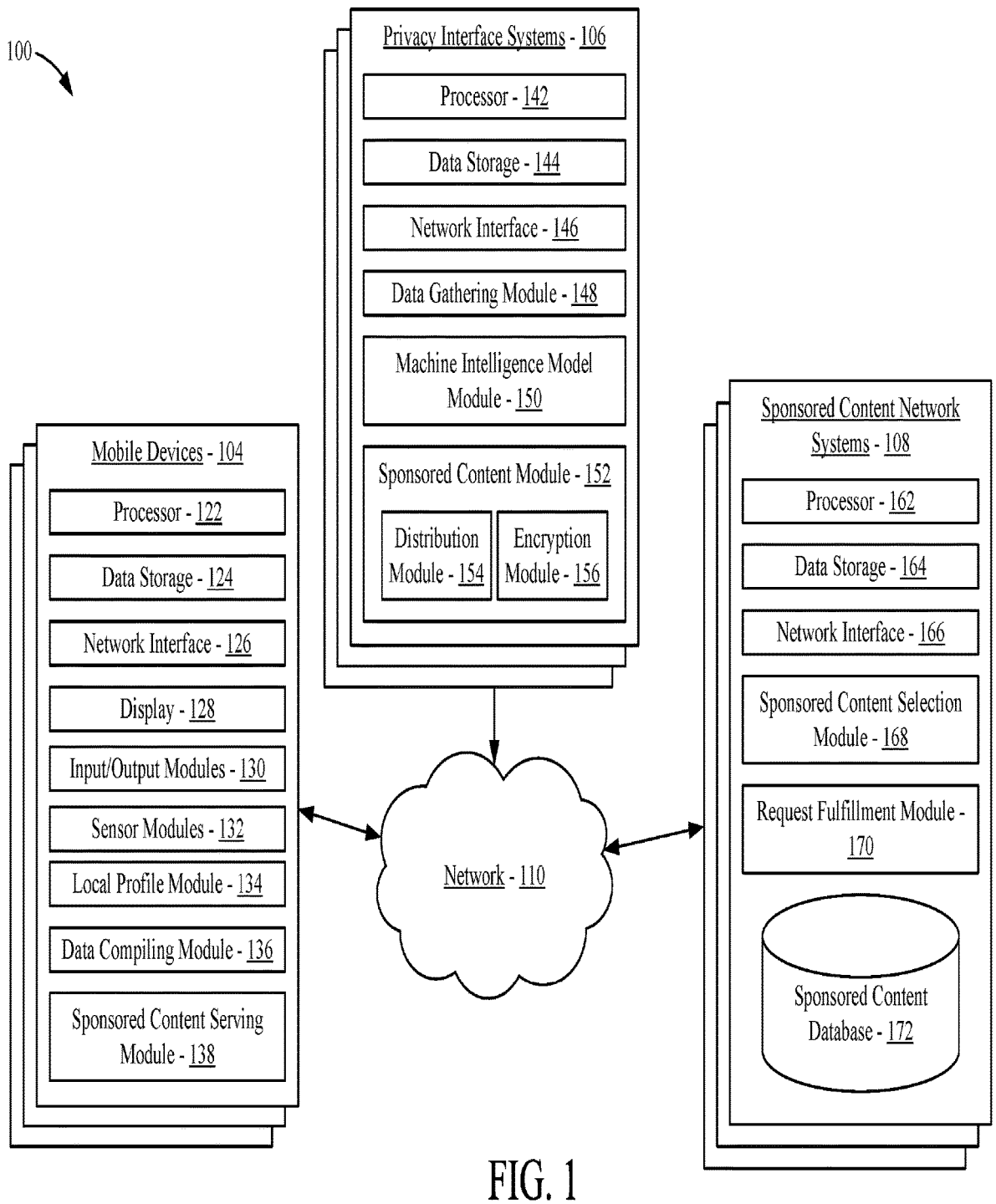
FIG. 1 is a block diagram depicting an implementation of an environment that may be used for providing private local sponsored content items.

Following below are more detailed descriptions of various concepts related to, and implementations of, methods, apparatuses, and systems for providing private local sponsored content. The various concepts introduced above and discussed in greater detail below may be implemented in any of numerous ways, as the described concepts are not limited to any particular manner of implementation. Specific implementations and applications are provided primarily for illustrative purposes.

In some instances, systems and methods for providing private local sponsored content networks are desirable where the data processing resulting in better targeting of sponsored content items is distributed among mobile devices. This allows greater data gathering capabilities through the use of the sensors of the mobile devices as well as data stored on data storage components of the mobile devices to create better predictive models while offering better opportunities to preserve privacy. Locally stored profiles comprising machine intelligence models may also be used to determine the relevance of data gathered through sensors or from data storage components in improving an aggregated model for identifying the relevance of data and the selection of sponsored content items. Some techniques for preserving privacy include private information retrieval cryptographic techniques when downloading sponsored content items or lists of sponsored content items, the use of homomorphic encryption when downloading sponsored content items or lists, homomorphic encryption when aggregating data or uploading improvements or additional data for the model or statistics concerning the sponsored content items, local differential privacy when uploading the data and statistics, and global differential privacy when aggregating the data and statistics. Other private information retrieval techniques for downloading sponsored content items can include retrieval of random sets of sponsored content items, with one being the desired sponsored content item and downloading from a number of replicas of a sponsored content item database that are prevented from colluding. Federated optimization or distributed optimization can be used in conjunction with privacy techniques to create improved machine intelligence models for use in determining relevant data and selecting sponsored content items. Publishers may also benefit from the improved privacy by protecting the statistics of type or volume of sponsored content items shown with their associated publisher content.

For purposes of reading the description of the various implementations below, the following descriptions of the sections of the specification and their respective contents may be helpful:

Section A describes an environment for a system for providing private local sponsored content which may be useful for practicing implementations described herein.

Section B describes implementations of methods for providing private local sponsored content.

Section C describes a network environment and computing environment which may be useful for practicing implementations described herein.

A. Private Local Sponsored Content Item Environment

Prior to discussing the specifics of implementations of the systems and methods for providing private local sponsored content, it may be helpful to discuss an implementation of an environment where such systems and methods may be deployed. FIG. 1 depicts one implementation of an environment 100. In brief overview, the environment 100 comprises mobile devices 104, communicating over a network 110 to privacy interface systems 106 and/or sponsored content network systems 108. The mobile devices 104 may be any number of different types of personal and mobile electronic devices configured to communicate via the network 110 (e.g., a laptop computer, a tablet computer, a smartphone, a digital video recorder, combinations thereof, etc.).

The network 110 may be any form of computer network that relays information between the mobile devices 104, the privacy interface systems 106, and the sponsored content network systems 108. In some implementations, the network 110 may include the Internet and/or other types of data networks, such as a local area network (LAN), a wide area network (WAN), a cellular network, satellite network, or other types of data networks. The network 110 may also include any number of additional computing devices (e.g., computers, servers, routers, network switches, smartphones, tablets, mobile phones, etc.) that are configured to receive and/or transmit data within the network 110. These devices may aid connection to the network and may further use wireless communication methods such as a BLUETOOTH transceiver, a BLUETOOTH beacon, an RFID transceiver, Near Field Communication (NFC) transmitter or other similar technologies known in the art. The network 110 may further include any number of hardwired and/or wireless connections. For example, the mobile devices 104 may communicate wirelessly (e.g., via WiFi, cellular, radio, etc.) with a transceiver that is hardwired (e.g., via a fiber optic cable, a CAT5 cable, etc.) to other computing devices for communication over the network 110 to communicate with the sponsored content network systems 108. In some implementations, reliable communication methods are used over the network with acknowledgment and resend if there is no acknowledgment received.

Still referring to FIG. 1, the mobile devices 104 as depicted include a processor 122 and data storage 124. The data storage 124 may store machine instructions that, when executed by the processor 122, cause the processor 122 to perform one or more of the operations described herein. The processor 122 may include one or more microprocessors, application specific integrated circuits (ASICs), field programmable gate arrays (FPGAs), other forms of processing circuits, or combinations thereof. The data storage 124 may include, but is not limited to, electronic, optical, magnetic, or any other storage or transmission device capable of providing the processor 122 with program instructions. The data storage 124 may include storage devices such as a floppy disk, CD-ROM, DVD, magnetic disk, memory chip, ROM, RAM, EEPROM, EPROM, flash memory, optical media, or any other suitable memory from which the processor 122 can read instructions. The processor 122 and the data storage 124 may form a processing module. The data storage 124 may include files to run an operating system, a local profile module 134, a data compiling module 136, and a sponsored content serving module 138.

The mobile devices 104 are shown to include a network interface 126. In some implementations, the network interface 126 is a hardware interface allowing data to pass to and from the network 110 (e.g., the internet). In some implementations, the network interface 126 includes the hardware and logic necessary to communicate over multiple channels of data communication. For example, the network interface 126 may include an Ethernet transceiver, a cellular modem, a BLUETOOTH transceiver, a BLUETOOTH beacon, an RFID transceiver, and/or an NFC transmitter. Data passing through the network interface 126 may be encrypted such that the network interface 126 is a secure communication module.

The mobile devices 104 include a display 128. In some implementations, the display 128 is combined with a user input device in the form of a touchscreen device. The display may be any electronic device that conveys data to a user by generating sensory information (e.g., a visualization, sounds, etc.). The display 128 may be internal to the housing of the mobile device 104 (e.g., a built-in display) or external to the housing of the mobile device 104 (e.g., a monitor connected to the mobile device 104), according to various implementations. For example, the mobile device 104 may include a display 128, which may display webpages, user interfaces for applications, and/or other visual sources of information. In various implementations, the display 128 may be located inside or outside of the same housing as that of the processor 122 and/or the data storage 124. For example, the display 128 may be an external display, such as a computer monitor or any other stand-alone form of electronic display. In other examples, the display 128 may be integrated into the housing of a laptop computer, mobile device, smartphone, tablet, or other form of computing device having an integrated display.

In some implementations, the display 128 and user input devices and/or input/output modules 130 are combined in the form of a touchscreen device. The display 128 may be any electronic device that conveys data to a user by generating sensory information (e.g., a visualization, sounds, etc.). The input/output modules 130 of a mobile device 104 may be any electronic device that converts received information from a user into electronic signals (e.g., a keyboard, a mouse, a pointing device, a touch screen display, a microphone, etc.).

The mobile devices 104 are shown to include sensor modules 132. In some implementations the sensor modules 132 are configured to gather data of the environment and location of the mobile device 104 as well as biometric data from users of the mobile device 104. Sensor modules 132 may incorporate the sensor hardware as well as the circuitry to interpret sensor signals and communicate sensor data to the rest of the mobile device 104. Sensor modules 132 include, for examples, sensors such as gyroscopes, accelerometers, magnetometers, barometers, proximity sensors, temperature sensors, light sensors, humidity sensors, acoustic sensors, and the like. Of course the mobile device 104 can have other sensors, features, and components. In some implementations, the sensors (e.g., gyroscope, accelerometer, magnetometer, barometer, proximity sensor, temperature sensor, light sensor, humidity sensor, acoustic sensor, etc.) are configured to be communicatively coupled to one or more of the processor 122, the data storage 124, the display 234, the input/output modules 130, the network interface 126, and/or other components of the mobile device 104. A sensor module 132 comprising a gyroscope may include a microelectromechanical system (MEMS) gyroscope, a vibrating structure gyroscope (VSG) (e.g., a tuning fork gyroscope), and/or any other gyroscope. The gyroscope may be configured to measure the rate of rotation of the mobile device 104 about one, two, and/or three axes and/or the degrees of rotation relative to one, two, and/or three axes. A sensor module 132 comprising an accelerometer may include a MEMS accelerometer, a piezoelectric accelerometer, and/or any other accelerometer. The accelerometer may be configured to measure the acceleration of the mobile device 104 in one, two, and/or three axes and/or the direction of gravity relative to one, two, and/or three axes. A sensor module 132 comprising a magnetometer may include a magnetoresistive sensor and/or any other magnetometer. The magnetometer may be configured to measure the ambient geomagnetic field relative to the mobile device 104 in one, two, and/or three axes. A sensor module 132 comprising a barometer may include a digital barometer, an aneroid barometer, and/or any other barometer. The barometer may be configured to measure the air pressure around the mobile device 104. A sensor module 132 comprising a proximity sensor may include a reflective proximity sensor, an ultrasonic proximity sensor, and/or any other proximity sensor. The proximity sensor may be configured to measure the proximity of an object relative to the mobile device 104. A sensor module 132 comprising a temperature sensor may include a thermistor, a thermocouple, a silicon bandgap temperature sensor, an infrared thermometer, and/or any other temperature sensor. The temperature sensor may be configured to measure the ambient temperature around the mobile device 104. A sensor module 132 comprising a light sensor may include a charge-coupled device (CCD), a photodiode, a photovoltaic cell, and/or any other photodetector or light sensor. The light sensor may be configured to measure the ambient light level around the mobile device 104. A sensor module 132 comprising a humidity sensor may include a humistor, a capacitive humidity sensor, a thermal conductivity humidity sensor, and/or any other humidity sensor. The humidity sensor may be configured to measure the ambient humidity level around the mobile device 104. A sensor module 132 comprising an acoustic sensor may include a MEMS microphone, a fiber optic microphone, and/or any other acoustic sensor. The acoustic sensor may be configured to measure the ambient acoustic level around the mobile device 104. The values of the outputs of these or other sensors coupled to the mobile device 104 may be output to the processor 122, the data storage 124, the network interface 126, and/or any other component of the mobile device 104. While the foregoing has describes some examples of sensors that may be included in a mobile device 104, still other sensors may be included as well, such as atmospheric sensors, fluid velocity sensors, force sensors, etc.

The mobile devices 104 are shown to include a local profile module 134. In some implementations, the local profile module 134 comprises a local machine intelligence model generated from a received machine intelligence module. The received machine intelligence module is configured to comprise parameters and rules for determining which local data is relevant for selection of sponsored content. The local profile module 134 is configured to be periodically updated by receiving updated values for parameters or new and/or modified rules. In some implementations, the updated values for parameters or new and/or modified rules are received over the network interface 126. The local profile module 134 is also configured to have parameters updated from local data gathered from the mobile device 104. In some implementations, the local data gathered from the mobile device 104 is sensor data from the sensor modules 132 or data stored in data storage 124 which may include user profile information, account information, application usage information, or historical information from data gathered from sensor modules 132. In some implementations, the local profile module 134 is configured to select sponsored content items based on the local data available from sensor modules 132 of the mobile devices 104 as well as data from data storage 124 of the mobile devices 104. The local data may comprise sensor data gathered by the mobile device, user profile data, demographic data, mobile device usage data, and the like. In some implementations, the local profile module 134 is configured to use the local machine intelligence module to determine whether received data is relevant for use in selecting sponsored content items by applying the rules and parameters of the local machine intelligence model to the received data. In some implementations, relevance of the data is based on an association of the data to at least one of a predicted click-through rate, predicted impressions, predicted conversions, historical click-through rate, historical impressions, cost per action (CPA), conversion rate (CVR), cost per click-through (CPC), cost per sale (CPS), cost per lead (CPL), effective CPM (eCPM), a conversion rate (e.g., a number of sales per impression), and/or other performance metrics. In some implementations, determining whether data is relevant includes determining parameters with which a machine intelligence model can estimate the value of at least one of a predicted click-through rate, predicted impressions, predicted conversions, historical click-through rate, historical impression, CPA, CVR, CPC, CPS, CPL, eCPM, and/or other performance metrics. A In some implementations, the local profile module 134 is configured to determine whether received data is relevant by using a feature extractor to extract features from the received data. The feature extractor may create a vector of features associated with the received data. In some implementations, the feature extractor is based on linear regression with the strongest features identified that produce the strongest output of relevant data for successful selection of sponsored content items. The features extracted from the received data may be compared to features associated with a user profile of a user of the mobile device 104. Features about the user used in comparing may include demographics, application used, usage characteristics of applications used, and the like. In some implementations, the feature extractor is configured to store extracted features as vectors stored in a space and the local machine intelligence model is configured to compare the location in space of the feature vectors to sponsored content items based on the location of the sponsored content items in the space based on the sponsored content item features. In some implementations, a brute force approach is used to evaluate all combinations of extracted features to determine which produces the best result and adjust the local machine intelligence model accordingly. In some implementations, a forward search method is implemented by starting with one feature and incrementally adding other features to create sets of features, where the new features are only kept in the set of features if there is an improvement in the selection of sponsored content items when using the set. The best features, in terms of selection of sponsored content items are therefore retained for use in the local profile module 134. In some implementations, the local machine intelligence model is configured to use a deep neural net to match descriptions of sponsored content items to descriptions of features extracted from incoming data to determine the relevance of the received data with each layer of nodes in the deep neural net trained on a distinct set of features based on the previous layer's output. In some implementations, the deep neural net uses feedforward networks where the weights of the inputs to the deep neural nets are stored as the parameters of the local machine intelligence model.

The mobile devices 104 are shown to include a data compiling module 136. In some implementations, the data compiling module 136 is configured to collect data associated with the display and interaction of sponsored content items displayed on a mobile device 104 for sending in a privacy preserving manner (e.g., using local differential privacy, using global differential privacy, using encryption, etc.). In some implementations, the data compiling module 136 is also configured to collect and store other data associated with the mobile device 104 and user profiles stored on the mobile device 104, including demographic information, location information, installed applications, data usage, etc. In some implementations, the data compiling module 136 is configured to collect the data associated with display and interaction of sponsored content items displayed on the mobile device 104 comprising impressions and conversions of displayed sponsored content items as well as statistics of impressions, conversions, click through rate, predicted click through rate, associated with individual sponsored content items as well as categories the displayed sponsored content item are associated with. Still other performance metrics may be collected, such as CPA (where an action may be clicking on the content item or a link therein, a purchase of a product, a referral of the content item, etc.), CVR, CPC (counted when a content item is clicked), CPS, CPL, effective CPM, a conversion rate (e.g., a number of sales per impression), and/or other performance metrics. In some implementations, the sponsored content selection module 168 may be configured to use performance metrics stored in the sponsored content database 172 to build predictive models of performance for stored sponsored content items. Predictive models of performance may include predicted sponsored content item clicks, predicted conversion rates, predicted impressions, and the like when cross-referenced to additional information (e.g., demographics, application type, mobile device type, category of the sponsored content item, etc.).

The mobile devices 104 are shown to include a sponsored content serving module 138. In some implementations, the sponsored content serving module 138 is configured to include mediation code configured to select between multiple sponsored content networks when selecting a sponsored content item for display. The sponsored content serving module 138 is further configured to render the returned sponsored content item and handle interactions with the sponsored content including routing interactions with the sponsored content item to destination sites or landing URLs, launching of applications, counting clicks of the sponsored content item and the like. In some implementations, the sponsored content serving module 138 is configured to transmit data and/or statistics to the data compiling module 136 (e.g., impressions of sponsored content item, conversion of sponsored content item, click-through or selection of sponsored content item, etc.) In some implementations, the sponsored content serving module 138 is configured to interact with a privacy interface system 106 to request sponsored content items in a privacy preserving manner. In one example of the implementation, the sponsored content serving module 138 is configured to receive data comprising descriptive information of sponsored content items (e.g., a vector or array of sponsored content item descriptions) and can request one of the sponsored content items described. In one implementation, the sponsored content serving module 138 is configured to request a sponsored content item by sending a vector of encrypted entries corresponding to the vector of sponsored content item descriptions with an encrypted 'one' in the vector location corresponding to the desired sponsored content item and encrypted 'zeros' in the remaining vector locations, where encryption is in a homomorphic encryption to a server (e.g., a privacy interface system 106) that computes the homomorphically encrypted product of each vector entry and its corresponding sponsored content item and then returns the homomorphically encrypted sum of these products. The sponsored content serving module 138 is further configured to decrypt the returned value to produce the desired sponsored content item. In another implementation, the sponsored content serving module 138 is configured to send a request to a plurality of servers capable of returning the requested sponsored content item (e.g., privacy interface systems 106), each of the plurality of servers sent a request that consists of a vector of ones and zeros corresponding to the desired sponsored content, constrained such that the logical XOR of the request vectors has a 'one' in the entry corresponding to the desired sponsored content item and a 'zero' in the remaining vector locations such that each server computes the logical XOR of all the sponsored content items corresponding to the 'ones' in the request vector received by that server and returns the result of that logical XOR. The sponsored content serving module 138 is further configured to XOR all the servers' responses to produce the desired sponsored content item.

The privacy interface systems 106 as depicted include a processor 142, data storage 144, and a network interface 146. The data storage 144 may store machine instructions that, when executed by the processor 142, cause the processor 142 to perform one or more of the operations described herein. The processor 142 may include one or more microprocessors, application specific integrated circuits (ASICs), field programmable gate arrays (FPGAs), other forms of processing circuits, or combinations thereof. The data storage 144 may include, but is not limited to, electronic, optical, magnetic, or any other storage or transmission device capable of providing the processor 142 with program instructions. The data storage 144 may include storage devices such as a floppy disk, CD-ROM, DVD, magnetic disk, memory chip, ROM, RAM, EEPROM, EPROM, flash memory, optical media, or any other suitable memory from which the processor 142 can read instructions. The processor 142 and the data storage 144 may form a processing module. The data storage 144 may include files to run an operating system, a data gathering module 148 and a sponsored content module 152. In some implementations, the sponsored content module 152 further comprises a distribution module 154, and an encryption module 156.

The privacy interface system 106 is shown to include a network interface 146. In some implementations, the network interface 146 is a hardware interface allowing data to pass to and from the network 110 (e.g., the internet). In some implementations, the network interface 146 includes the hardware and logic necessary to communicate over multiple channels of data communication. For example, the network interface 146 may include an Ethernet transceiver, a cellular modem, a BLUETOOTH transceiver, a BLUETOOTH beacon, an RFID transceiver, and/or an NFC transmitter. Data passing through the network interface 146 may be encrypted such that the network interface 146 is a secure communication module.

The privacy interface system 106 is shown to include a data gathering module 148. In some implementations, the data gathering module 148 is configured to interface between mobile devices 104 and sponsored content network systems 108 to provide sponsored content items and communicate data and statistics regarding sponsored content items to content publishers as well as back to the sponsored content networks. In some implementations, one or more modules of the privacy interface system 106 is configured to run on or be integrated into a sponsored content network system 108. In some implementations, the data gathering module 148 is configured to receive statistics and data concerning sponsored content items sent to mobile devices 104 via the privacy interface system 106. In other implementations, the privacy interface systems 106 are configured to receive statistics and data in a private manner regarding displayed sponsored content items with the mobile devices 104 configured to request sponsored content items directly from the sponsored content network systems 108. In one example of an implementation to receive statistics and data in a private manner, the data gathering module 148 is configured to receive statistics and data from mobile devices 104 that are using local differential privacy techniques. Configuration to receive statistics and data using local differential privacy techniques may include receiving additional or incorrect data with some probability P while the actual or correct data is sent with probability (1−P) allowing for a trade-off between utility and privacy depending on the value of the probability. In another example of an implementation to receive statistics and data in a private manner, the data gathering module 148 is configured to receive statistics and data from mobile devices 104 that are using a global differential privacy technique. Configuration to receive statistics and data using global differential privacy techniques may include receiving statistics and data at a trusted system that aggregates the data to preserve privacy. In a further example of an implementation to receive statistics and data in a private manner, the data gathering module 148 is configured to receive statistics and data from mobile devices 104 that are using an encryption technique. Configuration to receive statistics and data using an encryption technique may include homomorphic encryption techniques where a system can compile and aggregate encrypted data and statistics sent from individual devices but once aggregated, the system needs the individual devices to help perform the decryption.

The privacy interface system 106 is shown to include a machine intelligence model module 150. In some implementations, the machine intelligence model module 150 is configured to provide and update local machine intelligence models on mobile devices 104. In some implementations, the machine intelligence model module 150 is configured to obtain update data from data gathering module 148 to calculate new parameter values to include in updates to local machine intelligence models. In some implementations, the machine intelligence model module 150 determines new rules based on the information gathered to include in updates to local machine intelligence models. The rules and parameter values included in machine intelligence models may be used to determine the relevance of data obtained from mobile devices 104 to the selection of sponsored content items as well as being used to select the sponsored content items. In some implementations, the rules and parameter values are determined from values received from many mobile devices updating local parameter values based on linear regression, non-linear regression, multivariate linear regression, and/or deep neural networking. In some implementations, the machine intelligence model module 150 is configured to first determine whether a version of the machine intelligence model is already installed on a mobile device 104. If there is no version of the machine intelligence model installed on the mobile device 104, the machine intelligence model module 150 provides an initial version of the machine intelligence model for the mobile device 104. If there is already a version of the machine intelligence model installed on the mobile device 104, the machine intelligence model module 150 is configured to determine whether to provide an update to the local machine intelligence model on the mobile device 104 or provide a complete version of an updated local machine intelligence model to the mobile device 104.

The privacy interface system 106 is shown to include a sponsored content module 152. In some implementations, the sponsored content module 152 is configured to interface between mobile devices 104 and sponsored content network systems 108 to provide sponsored content items and communicate data and statistics regarding sponsored content items to content publishers as well as back to the sponsored content networks. In some implementations, one or more modules of the privacy interface system 106 is configured to run on or be integrated into a sponsored content network system 108 or vice versa. In some implementations, the privacy interface system 106 is configured to choose from a selection of the sponsored content network systems 108 from which to request a sponsored content item for display on the mobile device 104. In other implementations, the privacy interface systems 106 are configured to receive statistics and data in a private manner regarding displayed sponsored content items with the mobile devices 104 configured to request sponsored content items directly from the sponsored content network systems 108. In some implementations, the sponsored content module 152 includes a distribution module 154 for distributing sponsored content items as well as statistics and data concerning sponsored content items. In some implementations, the sponsored content module 152 includes an encryption module 156 for distributing sponsored content items in ways using encryption.

In some implementations, the privacy interface system 106 may include a distribution module 154. The distribution module 154 comprises a component of the sponsored content module 152 configured to distribute sponsored content items to mobile devices 104. In some implementations, the distribution module 154 is configured to obtain the sponsored content items from one or more sponsored content network systems 108 and is configured to run as a mediator or run mediation code to select between the one or more sponsored content networks of the one or more sponsored content network systems 108. In some implementations, the distribution module 154 is configured to distribute descriptions of sponsored content items to mobile devices 104. Descriptions of sponsored content items may include affiliated categories, keywords, type of sponsored content item, display specifications, requirements to display, demographic information, expected revenue, and the like. The descriptions of sponsored content items as well as the sponsored content items themselves can be stored in various configurations including arrays, vectors, linked lists, binary trees, and the like. In some implementations, the distribution module 154 may also be configured to distribute data concerning sponsored content items, including statistics (e.g., impressions, conversions, click-through-rate, etc.) obtained from the data gathering module 148. The data concerning sponsored content items may be distributed to sponsored content network systems 108 or directly to publishers of non-sponsored content item content.

In some implementations, the privacy interface system 106 may include an encryption module 156. The encryption module 156 comprises a component of the sponsored content module 152 configured to distribute sponsored content items and/or data associated with sponsored content items using encryption to preserve privacy. Homomorphic encryption techniques that may be used when distributing sponsored content items include receiving vectors comprising an encrypted one along with encrypted zeros in the remaining entries and combining a vector of sponsored content items with the encrypted array prior to sending the combination to the requesting device. Further steps may include applying a summing function across all the vector entries prior to sending to the requesting device so only a single encrypted sponsored content item is sent without the privacy interface system 106 knowing which sponsored content item has been selected.

Still referring to FIG. 1, the sponsored content network systems 108 as depicted include a processor 162, a data storage 164, and a network interface 166. The data storage 164 may store machine instructions that, when executed by the processor 162, cause the processor 162 to perform one or more of the operations described herein. The processor 162 may include one or more microprocessors, application specific integrated circuits (ASICs), field programmable gate arrays (FPGAs), other forms of processing circuits, or combinations thereof. The data storage 164 may include, but is not limited to, electronic, optical, magnetic, or any other storage or transmission device capable of providing the processor 162 with program instructions. The data storage 164 may include storage devices such as a floppy disk, CD-ROM, DVD, magnetic disk, memory chip, ROM, RAM, EEPROM, EPROM, flash memory, optical media, or any other suitable memory from which the processor 162 can read instructions. The processor 162 and the data storage 164 may form a processing module. The data storage 164 may include files to run an operating system, a sponsored content selection module 168, and a request fulfillment module 170.

The sponsored content network systems 108 are shown to include a network interface 166. In some implementations, the network interface 166 is a hardware interface allowing data to pass to and from the network 110 (e.g., the internet). In some implementations, the network interface 166 includes the hardware and logic necessary to communicate over multiple channels of data communication. For example, the network interface 166 may include an Ethernet transceiver, a cellular modem, a BLUETOOTH transceiver, a BLUETOOTH beacon, an RFID transceiver, and/or an NFC transmitter. Data passing through the network interface 166 may be encrypted such that the network interface 166 is a secure communication module.

The sponsored content network systems 108 are shown to include a sponsored content selection module 168. In some implementations, the sponsored content selection module 168 is configured to communicate with mobile devices 104 and/or privacy interface systems 106. Configuration for communication with privacy interface systems 106 may include being configured to receive sponsored content requests from sponsored content modules 152 executing on the privacy interface systems 106. In some implementations, sponsored content network systems 108 are configured to communicate sponsored content items directly to the mobile devices 104. In some implementations, sponsored content network systems 108 are configured to receive all sponsored item requests from and send sponsored content items to one or more privacy interface systems 106 to maintain privacy of users of mobile devices 104. In some implementations, additional data accompanies or is contained in the requests for sponsored content items regarding type of sponsored content, format, category, and/or display requirements of the requesting mobile device 104. The sponsored content selection module 168 is configured to select a sponsored content item to satisfy the request and transmit the selected sponsored content item via the network 110 to a requesting mobile device 104 via a privacy interface system 106.

The sponsored content network systems 108 are shown to include a request fulfillment module 170. In some implementations, the request fulfillment module 170 is configured to communicate with mobile devices 104 via the network interface 166. In some implementations, the request fulfillment module 170 is configured to communicate with privacy interface systems 106 to send data associated with sponsored content item requests for distribution of sponsored content items to mobile devices 104 in a privacy preserving manner. In some implementations, the sent data associated with sponsored content item requests is a single sponsored content item. In some implementations, the data is a plurality of sponsored content items. The plurality of sponsored content items may be associated (e.g., by category, keyword, demographic, type of sponsored content item, etc.) and may be structured as a computer data structure (e.g., an array, a vector, a linked list, etc.). In some implementations, the data sent associated with sponsored content items does not include the sponsored content items but instead data associated with the sponsored content items (e.g., descriptions, keywords, demographic information, category information, etc.)

The sponsored content network systems 108 may also include a sponsored content database 172. In some implementations, the sponsored content database 172 includes files stored in non-volatile memory accessed by the sponsored content selection module 168 and the request fulfillment module 170 when selecting a sponsored content item. The sponsored content network systems 108 may use the sponsored content database 172, in some implementations, to store performance measures and other statistical measures associated with sponsored content items stored in the sponsored content database 172. Performance metrics may include revenue, click through rates, conversion rates, impressions and the like. In more detail, performance metrics may include a cost per impression (CPI) or cost per thousand impressions (CPM), where an impression may be counted, for example, whenever a content item is selected to be served for presentation with a resource. In some instances, the performance metric may include a click-through rate (CTR), defined as the number of clicks on the content item divided by the number of impressions. Still other performance metrics, such as CPA, CVR, CPC, CPS, CPL, eCPM, a conversion rate (e.g., a number of sales per impression), and/or other performance metrics may be stored. In some implementations, the sponsored content selection module 168 may be configured to use performance metrics stored in the sponsored content database 172 to build predictive models of performance for stored sponsored content items. Predictive models of performance may include predicted sponsored content item clicks, predicted conversion rates, predicted impressions, and the like when cross-referenced to additional information (e.g., demographics, application type, mobile device type, category of the sponsored content item, etc.).

In some implementations, one or more of the sponsored content selection or request fulfillment analysis (e.g., the sponsored content selection module 168 and request fulfillment module 170) may be done on a separate computer system than the sponsored content network systems 108 configured to send the results of the sponsored content selection or request fulfillment to the sponsored content network systems 108. The various modules as well as databases (e.g., sponsored content database 172 as depicted in the sponsored content network systems 108) may be done on other computing systems and servers and are not limited to the implementation as depicted. In some implementations, the sponsored content selection may be done on the mobile device 104 with the sponsored content network systems 108 configured to provide a plurality of sponsored content items responsive to a request. In some implementations, the plurality of sponsored content items is sent via a privacy interface system 106 to preserve privacy.

B. Methods for Providing Private Local Sponsored Content

Figure 2:
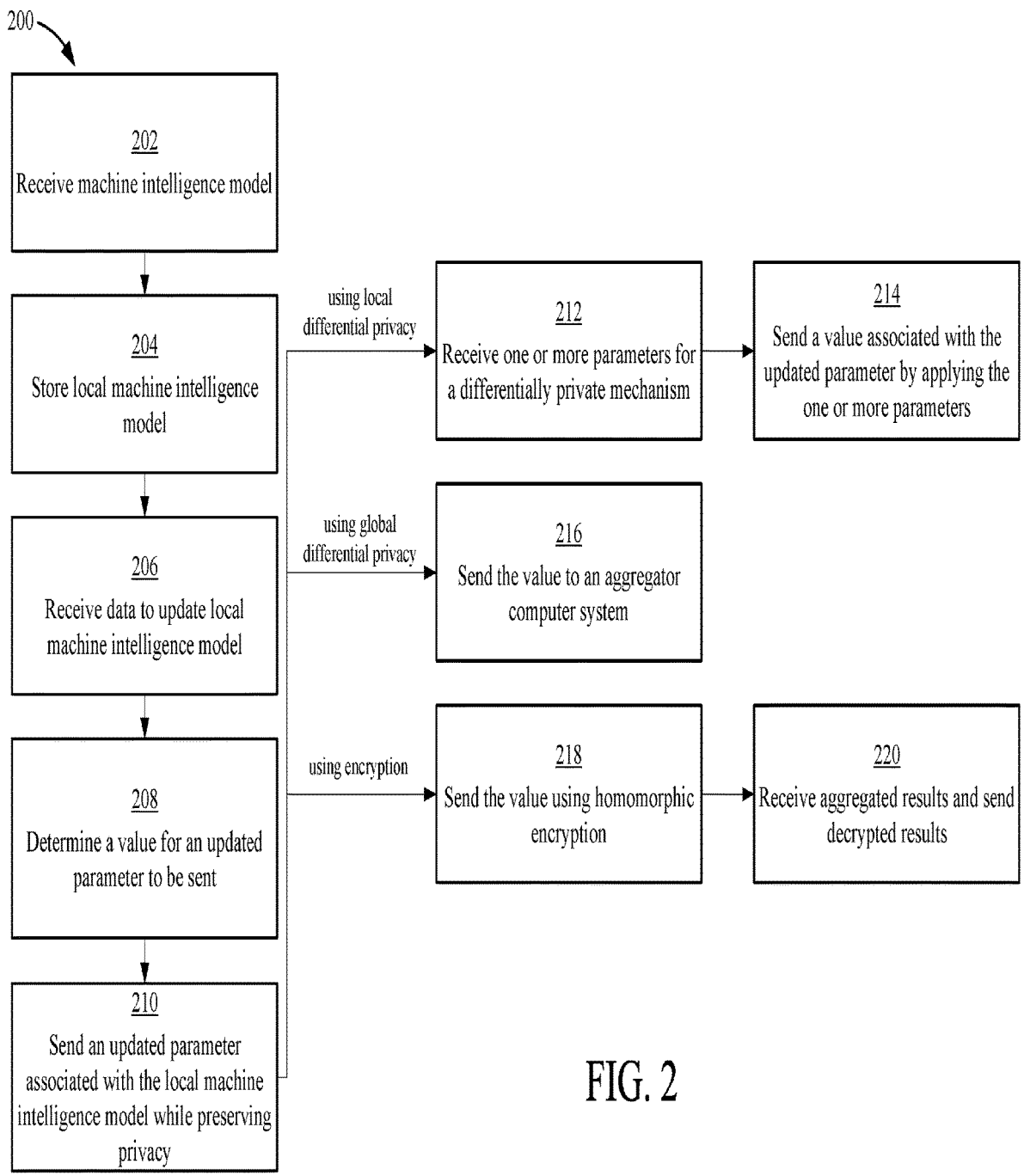
FIG. 2 is a block diagram depicting an implementation of a method of updating a local machine intelligence model and sending data associated with the update in a privacy preserving manner.

Referring now to FIG. 2, a block diagram of a method 200 of updating a local machine intelligence model and sending data associated with the update in a privacy preserving manner is depicted according to an implementation. In some implementations, the method 200 is performed by a processor 122 running instructions from data storage 124 on a mobile device 104. While performing the method 200, the mobile device 104 communicates data over a network interface 126 over a network 110 to a network interface 146 of a privacy interface system 106 and to a network interface 166 of a sponsored content network system 108. In brief overview of method 200, the method 200 includes receiving a machine intelligence model, storing the machine intelligence model, receiving data to update the local machine intelligence model, determining a value for an updated parameter to be sent, and sending an updated parameter associated with the local machine intelligence model while preserving privacy. If a local differential privacy technique is used, the method 200 includes receiving a value for a probability P and sending the value for the updated parameter with probability P. If a global differential privacy technique is used, the method 200 includes determining a value for the updated parameter to be sent and sending the value to an aggregator computer system. If encryption is used, the method 200 includes sending the value using homomorphic encryption and receiving aggregated results and sending decrypted results.

Still referring to FIG. 2 and in more detail, the method 200 begins when a machine intelligence model is received. In some implementations, the machine intelligence model comprises rules and parameters for determining if local data available on a mobile device 104 is relevant for the selection of sponsored content items. In some implementations, the machine intelligence model is also used to select sponsored content items based on the local data available on the mobile device 104.

A local machine intelligence model is stored at 204. In some implementations, the machine intelligence model received at 202 is stored as an initial version of the local machine intelligence model. In some implementations, the machine intelligence model is adapted for use on a mobile device 104 storing the local machine intelligence model prior to being stored as the local machine intelligence model. Adaptation may include incorporating the machine intelligence model into a local user profile stored on the mobile device 104. In some implementations, when a plurality of users are identified for the mobile device 104, a different adaptation of the machine intelligence model is stored and associated with a user profile of each of the plurality of users. In some implementations, adaptation may include extracting information from the data storage 124 of the mobile device 104 and using the extracted information to adjust one or more of the parameters or rules included in the machine intelligence model. In some implementations, a user of the mobile device 104 is queried for additional information during the installation of the initial version of the local machine intelligence model with the additional information used during the adaptation. In one example of obtaining information from the data storage 124, demographic information is located on the data storage 124 of the mobile device 104 and used to adjust a parameter affecting a rule that determines when the location of the mobile device 104 obtained from sensor data is relevant. In another example of obtaining information from the data storage 124, usage data of the mobile device 104 is located on the data storage 124 of the mobile device 104 and used to adjust a parameter affecting a rule that determines a favored category when selecting sponsored content items.

Data is received to update the local machine intelligence model at 206. In some implementations, data is received both from updates received over the network 110 as well as local data from a mobile device 104 loaded with the respective local machine intelligence model. In some implementations, data received over the network 110 is an update to the machine intelligence model that replaces the local machine intelligence model currently on the mobile device 104. The updated version of the machine intelligence model is then adapted to the mobile device 104 to create the local machine intelligence model or used as received. In some implementations, the update comprises one or more changes to one or more parameters and/or rules of the local machine intelligence model and the respective parameter or rule of the local machine intelligence model is changed to conform to the updated value. The final state or value of the updated rule or parameter may be dependent on the starting state or value as well as other local data available on the mobile device 104. In some implementations, the updates received are from a privacy interface system 106 and created from the aggregated collection of statistics and data from a plurality of mobile devices 104 supplying the statistics and data in a privacy preserving manner. In some implementations, parameters are also updated from local data available on the mobile device 104 obtained from data storage 124, sensor modules 132, and/or input/output modules 130 of the mobile device 104. In one example, on a particular mobile device 104, there is a correlation between a pattern of accelerometer data and a demographic category, data obtained from the sensor modules 132 of the mobile device 104 show this pattern of accelerometer data, and a parameter related to the demographic category is updated in the local machine intelligence model on the mobile device 104.

A value for an updated parameter to be sent is determined at 208. In some implementations, the parameter has an updated value because of an update to the local machine intelligence model from data obtained from the sensor modules 132, data storage 124 and/or input/output modules 130 of the mobile device 104. In some implementations, the updated value is sent if a further correlation is determined between the use of the updated value in the selection of sponsored content items and an increase in interaction with sponsored content items (e.g., selection, manipulation, conversion, etc.).

The updated parameter associated with the local machine intelligence model is sent while preserving privacy at 210. In some implementations, the updated parameter is sent over the network 110 to a privacy interface system 106. In some implementations, the updated parameter (e.g., a value of the parameter along with parameter information) is sent to help create an updated version of the initial machine intelligence model that is sent to mobile devices 104 once aggregated with other information sent from a plurality of mobile devices 104. In some implementations, a plurality of updated parameters are sent at once. The data sent comprising the updated parameter or parameters may also include other data associated with the mobile device 104 and obtained from the sensor modules 132, data storage 124 and/or input/output modules 130 as such data corresponds to the updated value of the parameter or parameters. Additional information (e.g. demographic information) may also be sent without an immediate correspondence to the updated value of the parameter or parameters in case an association between the updated values and the additional information can be made once the data is aggregated with data obtained from a plurality of mobile devices 104. In some implementations, other data comprising data or statistics related to interaction with sponsored content items (e.g., impressions, conversions, click-throughs, etc.) are also sent when there is an association with the updated value of the parameter(s). The additional data or statistics related to interaction with sponsored content items may also be sent when there is no local association with the value of the updated parameter(s) but such an association may be made once the data is aggregated with data obtained from a plurality of mobile devices 104.

If a local differential privacy technique is used to preserve privacy, parameters are received associated with a differentially private mechanism at 212. In some implementations, the mechanism uses the adding of controlled noise (e.g., Laplace noise, Gaussian Noise, etc.). In some implementations, other differentially private mechanisms (e.g., exponential mechanism, posterior sampling, and the like) are used. In general, the local differential privacy technique may consist of a randomizing mechanism and one or more parameters that configure the randomization. When the amount of randomization increases, more data is required to obtain sufficiently accurate results. In one simple example, a probability P is received from a privacy interface system 106 over the network 110 for data configured to be received in a binary fashion (e.g., the value is accurate or not accurate). In such implementations, the value for probability P may be between 0.5 and 1. When probability P is closer to 0.5, the amount of privacy is increased for a user of the mobile device 104 but more data is needed from mobile devices 104 to gain useful data in aggregate for statistical analysis. When probability P is closer to 1, the amount of privacy is decreased for a user of the mobile device 104 but less data is needed from mobile devices 104 to gain useful data in aggregate for statistical analysis. In another example, the data reported could have one of four options, where probability P may be set to be slightly more than 0.25. Alternately, a 4-valued data may be encoded in a binary representation (e.g., a length 4 binary vector with one bit set, a length 2 vector, or the like), with the encoding of each bit of the vector. Other parameters and configurations may be used to apply the randomization mechanism and parameters to the data.

A value for the updated parameter is sent using the differentially private mechanism at 214. In some implementations, the value (actual or otherwise) of the updated parameter is sent upon a request received for an updated parameter from a privacy interface system 106. In some implementations, there is a set number of values that the parameter can be (e.g., one of the values in an array of values) and if a value other than the actual value is sent, the sent value is selected from one of the other values from the set number of values. In some implementations, the selection of one of the other values is determined randomly. In some implementations, other data may be sent along with the updated value of the parameter (e.g., other parameter values, other updated parameter values, sensor data, demographic data, sponsored content item statistical performance data, etc.) and the other data sent also has the values of the data sent using the differentially private mechanism.

If a global differential privacy technique is used to preserve privacy, the value is sent to an aggregator computer system at 216. In some implementations, the aggregator computer system would have to be trusted by a user of a mobile device 104 to preserve the privacy of the user for any data received before aggregating the results from many mobile devices 104 and sending on the anonymous statistics and other data. In some implementations, the aggregator computer system is a privacy interface system 106. In some implementations, the aggregator computer system is a separate computer system and passes on the aggregated results to a privacy interface system 106.

If encryption is used to preserve privacy, the value is sent after being encrypted at 218. In some implementations the value is encrypted using homomorphic encryption (e.g., by using a public key on the mobile device 104) allowing the receiving computer system (e.g., a privacy interface system 106) to aggregate the contributions from a plurality of mobile devices 104 without decrypting the contributions until the data from a specified number of clients has been received. Once a sufficient number of contributions is aggregated to preserve privacy, the aggregated results are decrypted by the contributing mobile devices 104 using the corresponding private key and the decrypted results sent back to the privacy interface system 106. In some implementations, for greater privacy, this is combined with the private differential privacy technique by adding noise to the encrypted contributions sent to the privacy interface systems 106 or by only sending values of the encrypted contributions sent to the privacy interface systems 106 using a differential privacy mechanism.

The encrypted, aggregated results are received and the decrypted, aggregated results are sent back at 220. In some implementations, once a sufficient number of mobile devices 104 have contributed data results to create adequate privacy, the privacy interface systems 106 can aggregate the homomorphically encrypted data and send the aggregated data to the contributing mobile devices 104 for decryption using the respective private keys of the contributing mobile devices 104. The mobile devices 104 can then send the resulting decrypted data back to the privacy interface systems 106.

Figure 3:
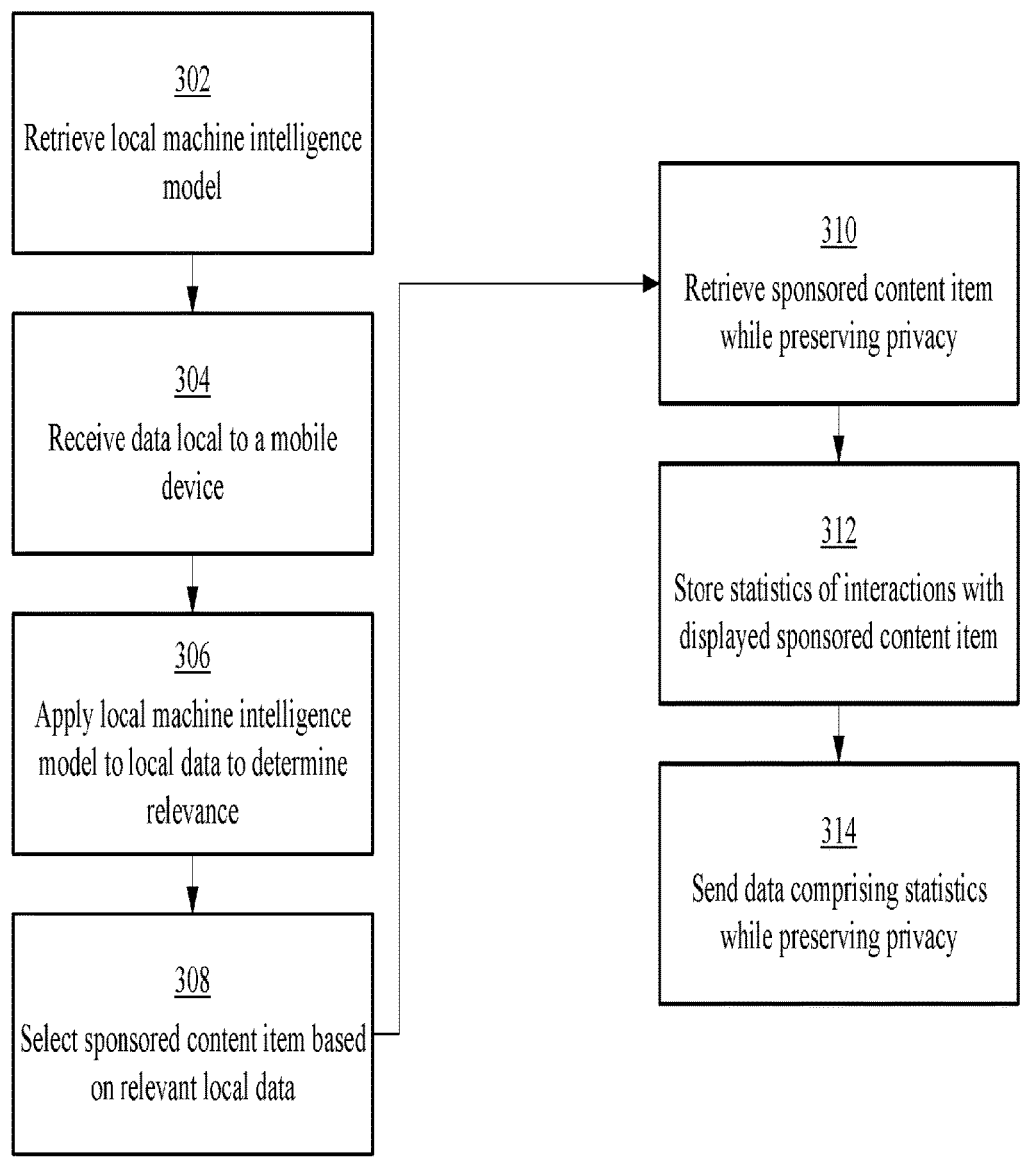
FIG. 3 is a block diagram depicting an implementation of a method of using a local machine intelligence model to determine relevance of received data, select a sponsored content item based on relevant data, and report statistics concerning the sponsored content item in a privacy preserving manner.

Referring now to FIG. 3, a block diagram of a method 300 of using a local machine intelligence model to determine relevance of received data, select a sponsored content item based on relevant data, and report statistics concerning the sponsored content item in a privacy preserving manner is depicted according to an implementation. In some implementations, the method 300 is performed by a processor 142 running instructions from data storage 144 on a mobile device 104. While performing the method 200, the mobile device 104 communicates data over a network interface 126 over a network 110 to a network interface 146 of a privacy interface system 106 and to a network interface 166 of a sponsored content network system 108. In brief overview of method 300, the method 300 includes retrieving a local intelligence model, receiving data local to the mobile device 104, applying the local intelligence model to the local data to determine relevance, selecting a sponsored content based on relevant local data, retrieving a sponsored content item while preserving privacy, storing statistics of interactions with displayed sponsored content items, and sending data comprising the statistics while preserving privacy.

Still referring to FIG. 3 and in more detail, the method 300 begins when a local machine intelligence model is retrieved at 302. In some implementations, the local machine intelligence model comprises rules and parameters for determining if local data available on a mobile device 104 is relevant for the selection of sponsored content items updated and customized to the mobile device 104 on which the local machine intelligence model is installed. In some implementations, the machine intelligence model is also used to select sponsored content items based on the local data available on the mobile device 104. In some implementations, if there is not a local machine intelligence model present, an initial version of the machine intelligence model is retrieved (e.g., over the network 110 from a privacy interface system 106). The retrieved machine intelligence model can be used as received or first updated using local data available on the mobile device 104 on which it is installed.

Data local to the mobile device 104 is received at 304. In some implementations, the data may be received from sensor modules 132 of the mobile device 104, input received from input/output modules 130 of the mobile device 104, as well as data already stored in data storage 124 of the mobile device 104. In some implementations, certain data streams (e.g., from one or more sensor modules 132 or one or more input/output modules 130) are monitored using the local machine intelligence model to determine relevance for particular data or patterns of data. In one example of the implementation, rules in the local machine intelligence model call for monitoring of repeated patterns in data from an accelerometer integrated in the mobile device 104. The collected data from the accelerometer is then used as the data received at 304.

The local machine intelligence model is applied to the local data to determine relevance at 306. In some implementations, the relevance is used to determine a usefulness of the data in the selection of sponsored content items for display on the mobile device 104. In some implementations, the relevance is used to determine a usefulness of the data in updating the local machine intelligence model. In some implementations, relevance of the data is based on an association of the data to at least one of a predicted click-through rate, predicted impressions, predicted conversions, historical click-through rate, historical impressions, CPA, CVR, CPC, CPS, CPL, eCPM, a conversion rate (e.g., a number of sales per impression), and/or other performance metrics Updating the local machine intelligence model may comprise updating a value of one or more parameters of the local machine intelligence model. In some implementations, the local profile module 134 is configured to use the local machine intelligence module to determine whether received data is relevant for use in selecting sponsored content items. In some implementations, the local profile module 134 is configured to determine whether received data is relevant by using a feature extractor to extract features from the received data. The feature extractor may create a vector of features associated with the received data. In some implementations, the feature extractor is based on linear regression with the strongest features identified that produce the strongest output of relevant data for successful selection of sponsored content items. The features extracted from the received data may be compared to features associated with a user profile of a user of the mobile device 104. Features about the user may include demographics, application used, usage characteristics of applications used, and the like. In some implementations, the feature extractor stores extracted features as vectors stored in a space and the local machine intelligence model is configured to compare the location in space of the feature vectors to sponsored content items based on the location of the sponsored content items in the space based on the sponsored content item features. In some implementations, a brute force approach is used to evaluate all combinations of extracted features to determine which produces the best result and adjust the local machine intelligence model accordingly. In some implementations, a greedy forward search method is implemented by starting with one feature and incrementally adding other features, where the new features are only kept if there is an improvement in the selection of sponsored content items. In some implementations, the local machine intelligence model and feature extractor uses a deep neural net to match descriptions of sponsored content items to descriptions of features extracted from incoming data to determine the relevance of the received data with each layer of nodes in the deep neural net trained on a distinct set of features based on the previous layer's output. In some implementations, the deep neural net uses feedforward networks where the weights of the inputs to the deep neural nets are stored as the parameters of the local machine intelligence model.

A sponsored content item is selected based on relevant local data at 308. In some implementation, local data is determined to be relevant by applying a local machine intelligence model to the local data (e.g., at 306). In some implementations, relevant local data as determined by the local machine intelligence model has been used to create a local user profile of one or more users of a mobile device 104 and the local user profile is used to select a sponsored content item. In some implementations, a sponsored content item is selected from a plurality of sponsored content items. In some implementations, a sponsored content item is selected based on data associated with a plurality of sponsored content items (e.g., categories of sponsored content items, keywords associated with the sponsored content items, demographic data associated with the sponsored content item, etc.) The data associated with the plurality of sponsored content items may be contained in a data structure (e.g., an array, a vector, a linked list, etc.). In some implementations, the sponsored content item is selected by matching elements of a local user profile as created or augmented by the use of a local machine intelligence model to elements of the data associated with the plurality of sponsored content items. For example, the local user profile contains elements associating a user of a mobile device 104 with a demographic of male users between the age of 21-30 and a match is found to a sponsored content item associated with the demographic of male users between the age of 21-30 and the sponsored content item is selected.

A sponsored content item is retrieved while preserving privacy of a user of a mobile device 104 at 310. In some implementations, the sponsored content item is first selected using information available only on a mobile device 104 (e.g., such as in step 308). In some implementations, the data is retrieved using a private information retrieval technique to further enhance privacy by obscuring exactly which sponsored content items are requested by a given mobile device 104. In some implementations, the private information retrieval technique comprises, requesting a number of sponsored content items in addition to the desired sponsored content item to obscure the sponsored content item actually displayed to a user of a mobile device 104. In some implementations, the private information retrieval technique comprises using homomorphic encryption to request the sponsored content item. For example, the mobile device 104 provides a computing system (e.g., a privacy interface system 106) with a vector containing a plurality of encrypted entries corresponding to a plurality of offered sponsored content items. One entry of the plurality of encrypted entries is an encryption of the value '1' while the remaining entries are an encryption of the value '0'. The computing system with the plurality of offered sponsored content items multiplies the encrypted vector in the request homomorphically to a vector of the plurality of offered sponsored content items such that each element of the encrypted vector is multiplied with the corresponding element of the plurality of offered sponsored content items. Then the computing system adds all the results of the multiplications homomorphically and ends up with a sum of a plurality of encrypted zeros and one encrypted sponsored content item as selected by the mobile device 104 without the capability of knowing which sponsored content item was selected and the encrypted sponsored content item is sent back to the mobile device 104 that requested it where it can then be decrypted by the mobile device 104 using the private key for the encryption and used.

In other implementations, the private information retrieval technique comprises using cloaking of the requests for sponsored content items using a plurality of copies of the data structure comprising the sponsored content items (e.g., a plurality of privacy interface systems 106 each containing a copy of a database with the sponsored content items). The plurality of copies of the database may be in various formats such as a database structure, array, vector, linked list, binary tree, etc. In one example of the implementation, a binary query vector is sent to each copy of the data structure comprising the sponsored content items and each binary query vector is constrained such that the logical XOR of the query vectors has a 'one' in the entry corresponding to the desired content item and a 'zero' in the remaining vector locations. The systems with the copies of the data structure compute the logical XOR of all the sponsored content items corresponding to the 'ones' in the received binary query vector. The result, which is the size of a single sponsored content item, is sent back. Each system returns a different result since the binary query vectors differed, and the requesting device (e.g., a mobile device 104) takes the returned results and logically XORS all the returned responses to produce the desired sponsored content item because of the constraint. As long as at least one of the systems with duplicate data structures is not colluding with the other systems there is a measure of privacy in requesting a particular sponsored content item.

Statistics of interactions with sponsored content items displayed on a mobile device 104 are stored at 312. In some implementations the statistics data is stored in data storage 124 on the mobile device 104. Such stored interactions include impressions, conversions, click-throughs, interactions, closing of sponsored content item, abandonment of purchases, and the like. The data comprising the interactions with sponsored content items may further include publisher content items with which the sponsored content items were displayed such as publisher name, category of publisher, type of publisher content, and the like. Other data associated with the interactions with sponsored content items may also be stored such as time and date, location of mobile device 104, applications on mobile device 104, received sensor data obtained during interaction, and the like. In some implementations, the statistics data are further separated and categorized by particular sponsored content items, categories of sponsored content items, sponsored content item format, and the like. Sponsored content item formats may include a type of sponsored content item (e.g., static or animated), height and width restrictions, color, resolution, and the like. In some implementation, sensor data may be associated with data indicating whether a sponsored content item has been interacted with and comprise response data. The response data may be any form of response data that may be useful for determining a predictive model. For example, the response data may be data indicating whether a content item was clicked (e.g., a 1 if the content item was clicked and a 0 if not), whether a conversion occurred (e.g., a 1 if the selection and serving of the content item resulted in a sale and a 0 if not), etc. Thus, a mobile device 104 may include a set of values of sensor data and a set of response data associated with the set of values of sensor data when storing an interaction with a sponsored content item.

The data comprising statistics is sent while preserving privacy at 314. In some implementations, the data is sent to a privacy interface system 106. Performance statistics may comprise revenue, click through rates, conversion rates, impressions and the like. In some implementations, the performance statistics are further separated and categorized by particular sponsored content items, categories of sponsored content items, sponsored content item format, and the like. Sponsored content item formats may include a type of sponsored content item (e.g., static or animated), height and width restrictions, color, resolution, and the like. Various techniques including those described for FIG. 2 can be used to send the data comprising statistics while preserving privacy including using a local differential privacy technique, using a global differential privacy technique is used to preserve privacy, using encryption, as well as other techniques known in the art.

C. Network and Computing Environment

Figure 4:
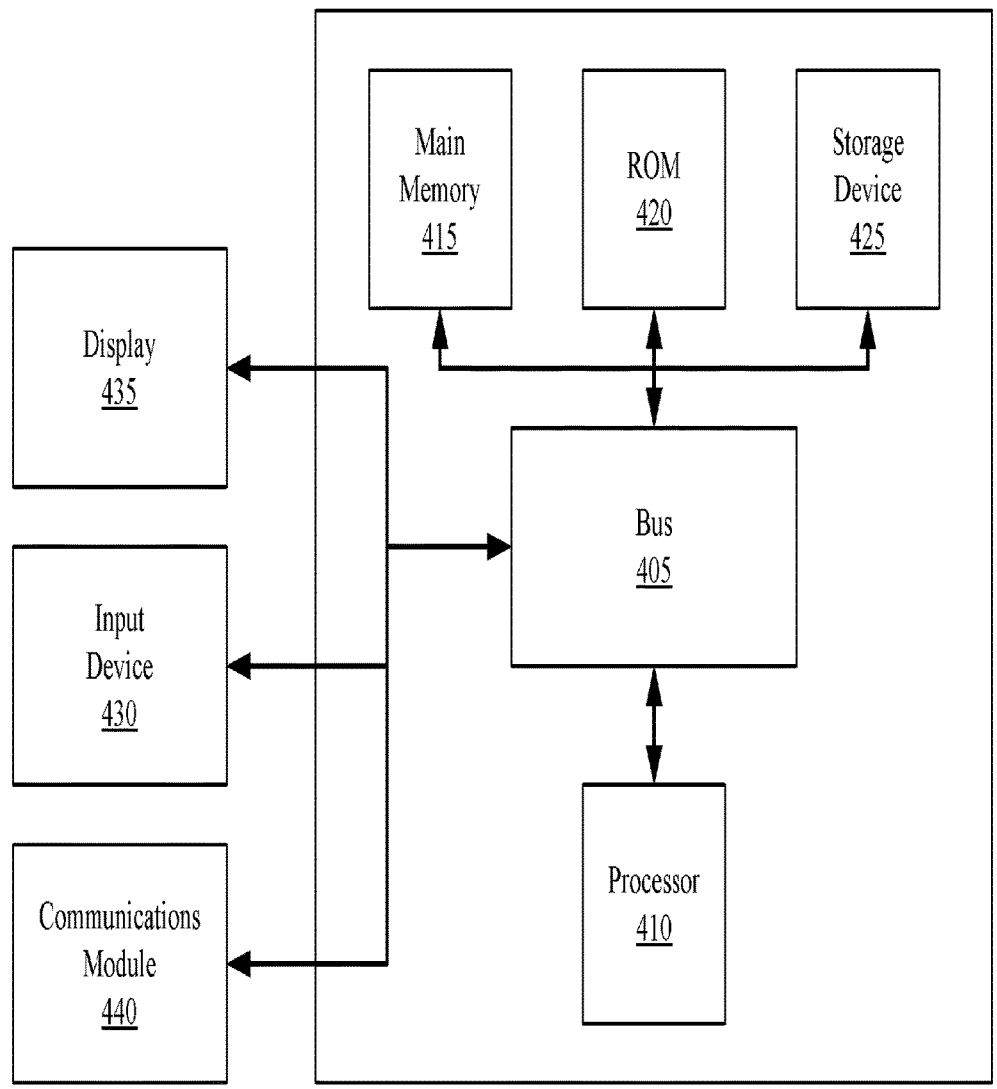
FIG. 4 is a block diagram depicting a general architecture for a computer system that may be employed to implement various elements of the systems and methods described and illustrated herein.

FIG. 4 is a block diagram of a computing system 400 that can be used to implement the mobile devices 104, the privacy interface systems 106, and the sponsored content network systems 108 and/or any other computing device described herein. The computing system 400 includes a bus 405 or other communication component for communicating information and a processor 410 or processing module coupled to the bus 405 for processing information. The computing system 400 also includes a main memory 415, such as a RAM or other dynamic storage device, coupled to the bus 405 for storing information, and instructions to be executed by the processor 410. The main memory 415 can also be used for storing position information, temporary variables, or other intermediate information during execution of instructions by the processor 410. The computing system 400 may further include a ROM 420 or other static storage device coupled to the bus 405 for storing static information and instructions for the processor 410. A storage device 425, such as a solid state device, magnetic disk or optical disk, is coupled to the bus 405 for persistently storing information and instructions. The device of the computing system 400 may include, but is not limited to, digital computers, such as laptops, desktops, workstations, personal digital assistants, servers, blade servers, mainframes, cellular telephones, smart phones, mobile computing devices (e.g., a notepad, e-reader, etc.), etc.

The computing system 400 may be coupled via the bus 405 to a display 435, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 430, such as a keyboard including alphanumeric and other keys, may be coupled to the bus 405 for communicating information and command selections to the processor 410. In another implementation, the input device 430 may be integrated with the display 435, such as in a touch screen display. The input device 430 can include a cursor control, such as a mouse, a trackball, or cursor direction keys, for communicating direction information and command selections to the processor 410 and for controlling cursor movement on the display 435.

According to various implementations, the processes and/or methods described herein can be implemented by the computing system 400 in response to the processor 410 executing an arrangement of instructions contained in the main memory 415. Such instructions can be read into the main memory 415 from another computer-readable medium, such as the storage device 425. Execution of the arrangement of instructions contained in the main memory 415 causes the computing system 400 to perform the illustrative processes and/or method steps described herein. One or more processors in a multi-processing arrangement may also be employed to execute the instructions contained in the main memory 415. In alternative implementations, hard-wired circuitry may be used in place of or in combination with software instructions to effect illustrative implementations. Thus, implementations are not limited to any specific combination of hardware circuitry and software.

The computing system 400 also includes a communications module 440 that may be coupled to the bus 405 for providing a communication link between the computing system 400 and the network 110. As such, the communications module 440 enables the processor 410 to communicate, wired or wirelessly, with other electronic systems coupled to the network 110. For instance, the communications module 440 may be coupled to an Ethernet line that connects the computing system 400 to the Internet or another network 110. In other implementations, the communications module 440 may be coupled to an antenna (not shown) and provides functionality to transmit and receive information over a wireless communication interface with the network 110.

In various implementations, the communications module 440 may include one or more transceivers configured to perform data communications in accordance with one or more communications protocols such as, but not limited to, WLAN protocols (e.g., IEEE 802.11a/b/g/n/ac/ad, IEEE 802.16, IEEE 802.20, etc.), PAN protocols, Low-Rate Wireless PAN protocols (e.g., ZIGBEE, IEEE 802.15.4-2003), Infrared protocols, BLUETOOTH protocols, EMI protocols including passive or active RFID protocols, and/or the like.

The communications module 440 may include one or more transceivers configured to communicate using different types of communication protocols, communication ranges, operating power requirements, RF sub-bands, information types (e.g., voice or data), use scenarios, applications, and/or the like. In various implementations, the communications module 440 may comprise one or more transceivers configured to support communication with local devices using any number or combination of communication standards. In various implementations, the communications module 440 can also exchange voice and data signals with devices using any number of standard communication protocols.

Although an example computing system 400 has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a non-transitory tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing module" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method for anonymized content retrieval comprising:
generating, by a client device, a vector consisting of a plurality of null values and a single positive value;
encrypting, by the client device, the vector using a homomorphic encryption function;
transmitting, by the client device to a content provider, the encrypted vector;
receiving, by the client device from the content provider, a plurality of content items multiplied by the encrypted vector;
decrypting, by the client device using the homomorphic encryption function, the received plurality of content items multiplied by the encrypted vector to extract a single content item corresponding to the single positive value of the unencrypted vector; and
presenting, by the client device, the single content item.

2. The method of claim 1, further comprising:
transmitting, by the client device to a second content provider, the encrypted vector;
receiving, by the client device from the second content provider, a second plurality of content items multiplied by the encrypted vector;
decrypting, by the client device using the homomorphic encryption function, the received second plurality of content items multiplied by the encrypted vector to extract a second single content item corresponding to the single positive value of the unencrypted vector;
selecting one of the single content item and the second single content item; and
presenting, by the client device, the selected content item.

3. The method of claim 1, wherein the content provider comprises a plurality of servers and further comprises transmitting, by the client device to each of the plurality of servers, the encrypted vector.

4. The method of claim 1, further comprising utilizing a privacy interface system, by the client device, to select the content provider from a set of content providers.

5. The method of claim 1, further comprising: receiving, by the client device, a machine intelligence model for generating the vector comprising rules and a first parameter and a second parameter.

6. The method of claim 5, further comprising: updating one or both of the first parameter and the second parameter of the machine intelligence model on the client device based on data stored on the client device.

7. The method of claim 6, further comprising: transmitting, by the client device to the content provider, the updated one or both of the first parameter and the second parameter of the machine intelligence model.

8. The method of claim 5, wherein updating one or both of the first parameter and the second parameter further comprises retrieving local data representing user interaction with the content item of the client device and adjusting one or both of the first parameter and the second parameter based on the local data.

9. The method of claim 1, further comprising: receiving sensor data from a sensor operably connected to the client device, and storing the data on the client device.

10. A system for anonymized content retrieval, comprising one or more processors and a network interface,
wherein the one or more processors are configured to:
generate a vector consisting of a plurality of null values and a single positive value, and
encrypt the vector using a homomorphic encryption function;
wherein the network interface is configured to transmit the encrypted vector to a content provider, and receive a plurality of content items multiplied by the encrypted vector from the content provider; and
wherein the one or more processors are further configured to:
decrypt, using the homomorphic encryption function, the received plurality of content items multiplied by the encrypted vector to extract a single content item corresponding to the single positive value of the unencrypted vector, and
present the single content item.

11. The system of claim 10,
wherein the one or more processors are further configured to generate a second vector consisting of a plurality of null values and a single positive value, and encrypt the second vector using a homomorphic encryption function;
wherein the network interface is further configured to transmit the encrypted vector to a second content provider, and receive a second plurality of content items multiplied by the encrypted vector from a second content provider; and
wherein the one or more processors are further configured to:
decrypt the received second plurality of content items multiplied by the encrypted vector to extract a second single content item corresponding to the single positive value of the unencrypted vector,
select a selected content item between the single content item and the second single content item, and
present the selected content item.

12. The system of claim 10, wherein the content provider comprises a plurality of servers and the network interface is configured to transmit the encrypted vector to each of the plurality of servers.

13. The system of claim 10, wherein the one or more processors are further configured to: utilize a privacy interface system to select the content provider from a set of content providers.

14. The system of claim 10, wherein the one or more processors are further configured to:
retrieve data from a memory element of the client device comprising demographic data from a user profile to create retrieved data;
encrypt the retrieved data; and
transmit, via the network interface, the encrypted, retrieved data.

15. The system of claim 14, wherein the content item has been further encrypted by applying a summing function across all the vector entries.

16. The system of claim 10, wherein the plurality of content items are each associated with at least one of: a category, a keyword, a demographic, and a type.

17. The system of claim 10, wherein the one or more processors are further configured to: receive, via the network interface, a machine intelligence model for generating the vector comprising rules and a first parameter and a second parameter.

18. The system of claim 17, wherein the one or more processors are further configured to: update one or both of the first parameter and the second parameter of the machine intelligence model on the client device via the network interface based on data stored on the client device.

19. The system of claim 18, wherein the one or more processors are further configured to: transmit the updated one or both of the first parameter and the second parameter of the machine intelligence model.

20. The system of claim 17, wherein the one or more processors are further configured to: retrieve local data representing user interaction with the content item of the client device and adjust one or both of the first parameter and the second parameter based on the local data.

* * * * *